United States Patent
Chen et al.

(10) Patent No.: US 8,515,948 B2
(45) Date of Patent: Aug. 20, 2013

(54) MANAGING MATERIALIZED QUERY TABLES (MQTS) OVER FINE-GRAINED ACCESS CONTROL (FGAC) PROTECTED TABLES

(75) Inventors: Yao-Ching S. Chen, Saratoga, CA (US); Curt L. Cotner, Gilroy, CA (US); Gerald G. Kiernan, San Jose, CA (US); David J. Kuang, Elk Grove, CA (US); Irene C. Liu, San Jose, CA (US); Regina J. Liu, San Jose, CA (US); Walid Rjaibi, Markham (CA); Timothy J. Vincent, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 13/044,415

(22) Filed: Mar. 9, 2011

(65) Prior Publication Data

US 2012/0233148 A1    Sep. 13, 2012

(51) Int. Cl.
*G06F 7/00* (2006.01)
*G06F 17/30* (2006.01)

(52) U.S. Cl.
CPC .... *G06F 17/30448* (2013.01); *G06F 17/30442* (2013.01); *G06F 17/30935* (2013.01); *G06F 17/30383* (2013.01)
USPC .............. 707/717; 707/781; 707/787; 726/27

(58) Field of Classification Search
CPC ................... G06F 17/30442; G06F 17/30448; G06F 17/30935; G06F 17/30383
USPC .................... 707/713, 717, 781, 787; 726/27
See application file for complete search history.

(56) References Cited

U.S. PATENT DOCUMENTS 7,685,194 B2 *  3/2010  Kabra et al. .................. 707/719
2005/0144176 A1   6/2005  Lei et al.

(Continued)

FOREIGN PATENT DOCUMENTS

CN       101075254     11/2007
GB       2460321       12/2009

(Continued)

OTHER PUBLICATIONS

Agrawal, R., P. Bird, T. Grandison, J. Kiernan, S. Logan, and W. Rjaibi, "Extending Relational Database Systems to Automatically Enforce Privacy Policies", Proceedings of the 21st International Conference on Data Engineering (ICDE '05), Apr. 2005, 10 pp.

(Continued)

*Primary Examiner* — Phong Nguyen
(74) *Attorney, Agent, or Firm* — Janaki K. Davda; Konrad, Raynes, Davda & Victor LLP

(57) ABSTRACT

Provided are techniques for creating one or more fine-grained access control rules that are associated with a base table. A materialized query table is created from the base table without applying the one or more fine-grained access control rules associated with the base table when obtaining data from the base table. A fine-grained access control protection indicator is turned on for the materialized query table. In response to receiving a direct access request to the materialized query table in a query referencing the materialized query table, access is provided to the data in the materialized query table by applying one or more fine-grained access control rules associated directly with the materialized query table to the data in the materialized query table before returning the data.

18 Claims, 6 Drawing Sheets

(56) References Cited

U.S. PATENT DOCUMENTS

| | | |
|---|---|---|
| 2006/0059567 A1* | 3/2006 | Bird et al. .................. 726/27 |
| 2007/0136291 A1* | 6/2007 | Bird et al. .................. 707/9 |
| 2008/0033955 A1* | 2/2008 | Fujii .................. 707/9 |
| 2008/0052291 A1* | 2/2008 | Bender .................. 707/9 |
| 2008/0071785 A1* | 3/2008 | Kabra et al. .................. 707/9 |
| 2008/0275880 A1* | 11/2008 | Bird et al. .................. 707/9 |
| 2009/0063951 A1* | 3/2009 | Rjaibi et al. .................. 715/234 |
| 2009/0182747 A1* | 7/2009 | Bird et al. .................. 707/9 |
| 2010/0185611 A1 | 7/2010 | Liao et al. |
| 2010/0262625 A1* | 10/2010 | Pittenger .................. 707/783 |

FOREIGN PATENT DOCUMENTS

| | | |
|---|---|---|
| JP | 2002175217 | 6/2002 |
| WO | 0227561 | 4/2002 |

OTHER PUBLICATIONS

IBM Corp., "DB2 Universal Database for z/OS Version 10 Programming Functional Specification (PFS): Row and Column Access Control (Line Item 827)", Jul. 1, 2009, 165 pp.

Rizvi, S., A. Mendelzon, S. Sudarshan, and P. Roy, "Extending Query Rewriting Techniques for Fine-Grained Access Control", Jun. 2004, Proceedings of the 2004 ACM SIGMOD International Conference on Management of Data, 12 pp.

* cited by examiner

MANAGING MATERIALIZED QUERY TABLES (MQTS) OVER FINE-GRAINED ACCESS CONTROL (FGAC) PROTECTED TABLES

BACKGROUND

Embodiments of the invention relate to managing Materialized Query Tables (MQTs) over fine-grained access control protected tables.

The issue of fine-grained access control has grown in importance to commercial and government users of relational databases, especially with recent government initiatives being put into place to strengthen overall security. Fine-grained access control may be used by an installation as part of a plan for complying with data protection laws such as the following:

Gramm-Leach Bliley Act
Health Insurance Portability and Accountability Act
European Union (EU) Data Protection Directive
Privacy laws in Canada, Japan, and Australia
Payment Card Industry Data Security Standards
Interagency Guidelines for Safeguarding Customer Information
Basel II operational controls, Sarbanes-Oxley internal controls Also, fine-grained access control may be used in response to high profile privacy breaches and identity theft cases and in response to customer and vendor pressure for increased privacy and security.

Materialized Query Tables (MQTs) are derived tables that are similar to views. However, MQTs pre-compute and store the contents of a view, rather than deriving the contents when the view is referenced in a Structured Query Language (SQL) statement. An MQT may be accessed directly like other tables by referencing the MQT in SQL statements. An MQT may also be accessed indirectly by a database query optimizer in order to optimize a SQL query against the same source tables as the MQT. The database optimizer determines that the data selected by the source query is a subset of the data in the MQT. The assumption is that a significant portion of the SQL query has been already pre-computed by the MQT and can be re-used to optimize the SQL statement.

However, there is a need in the art for improved application of fine-grained access control when using MQTs.

SUMMARY

Provided are a method, computer program product, and system for creating one or more fine-grained access control rules that are associated with a base table. A materialized query table is created from the base table without applying the one or more fine-grained access control rules associated with the base table when obtaining data from the base table. A fine-grained access control protection indicator is turned on for the materialized query table. In response to receiving a direct access request to the materialized query table in a query referencing the materialized query table, access is provided to the data in the materialized query table by applying one or more fine-grained access control rules associated directly with the materialized query table to the data in the materialized query table before returning the data.

BRIEF DESCRIPTION OF THE SEVERAL VIEWS OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
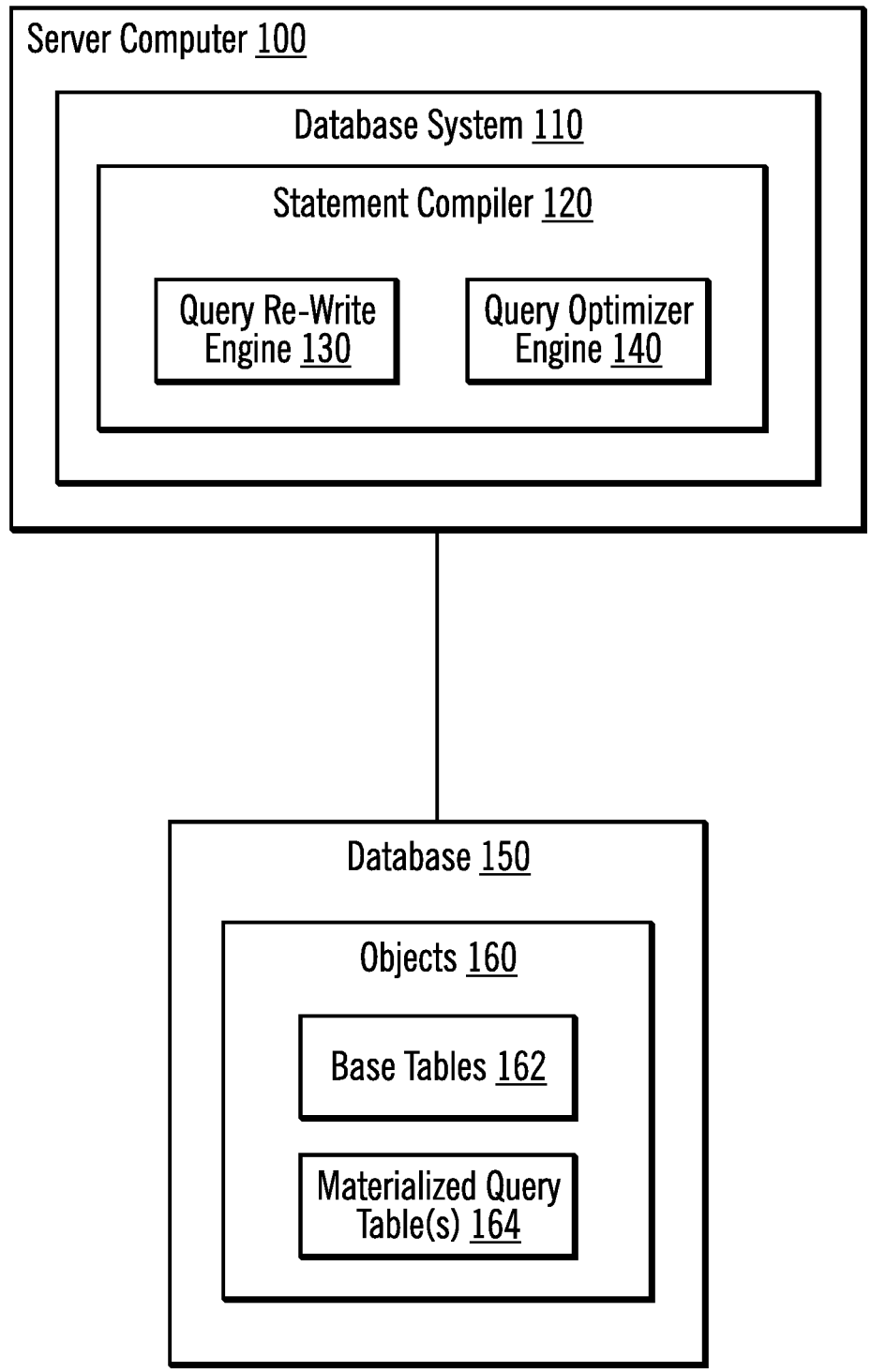
FIG. 1 illustrates, in a block diagram, a computing architecture in accordance with certain embodiments.

FIG. 1 illustrates, in a block diagram, a computing architecture in accordance with certain embodiments. A server computer 100 is coupled to a database 150. The server computer 100 includes a database system 110. The database system 110 includes a statement compiler 120 (e.g., a SQL compiler). The statement compiler 120 includes a query rewrite engine 130 and a query optimizer engine 140. In various embodiments, the database system 110 may include other components (not shown).

The database 150 includes objects 160. The objects 160 include tables 162 (i.e., database tables) and one or more Materialized Query Tables (MQTs) 164.

Fine-grained access control may be implemented with row access control (e.g., row permissions) and/or column access control (e.g., column masks) on the base tables 162.

A row permission may be described as a database object that expresses a row access control rule for a specific base table 162. In certain embodiments, the row permission contains the row access control rule in the form of a Structured Query Language (SQL) search condition that describes under what conditions who can access the rows of data in the base table 162. A CREATE PERMISSION statement with the FOR ROWS clause allows a user to create a row permission object. Multiple row permissions may be created for a base table 162. The definition of a row permission can reference the user, role, or group in the search condition. When multiple row permissions are defined for a base table 162, a row access control search condition is derived by application of the logical OR operator to the search condition in each enabled row permission. This row access control search condition is applied when the base table 162 is accessed.

A column mask may be described as a database object that expresses a column access control rule for a specific column. In certain embodiments, the column mask contains the column access control rule in the form of an SQL CASE expression that describes under what conditions who can receive the masked values returned for a column. A CREATE MASK statement allows a user to create a column mask object. Multiple column masks may be created for a base table 162. In certain embodiments, one column may have one column mask. The definition of a column mask may reference the user, role, or group in the CASE expression. The CASE expression may mask the stored column value before returning the column value to the application. The CASE expression may conditionally determine how the value should be returned depending on runtime conditions.

In certain embodiments, fine-grained access control row permissions and column masks use special registers that control the disclosure of information depending upon the user issuing the request. For a fine-grained access control protected base table 162, different users can have access to different portions of the base table 162 as regulated by the permissions and/or masks.

In certain embodiments, when MQTs 164 are defined over fine-grained access control protected base tables 162, each MQT 164 is maintained by the REFRESH TABLE statement. If a source base table 162 is fine-grained access control protected, and the fine-grained access control of the source base table 162 is applied when an MQT 164 is generated, the MQT 164 may be populated with different data each time, depending on the user who issues the REFRESH TABLE statement for the MQT 164 because different users can have access to different portions of the base table 162 as regulated by the fine-grained access control.

MQTs 164 are relied upon by data warehousing applications for better query performance. Embodiments ensure that fine-grained access control rules and MQTs 164 coexist in harmony. With embodiments, a harmonic coexistence implies:

Objective No. 1. MQTs 164 continue to provide added performance benefit to data warehousing applications.
Objective No. 2. MQTs 164 do not become a back door for gaining access to data protected through fine-grained access control in the dependent base tables 162, either through direct access to the MQT 164 or through improper query rewrite using the MQT 164.

There are three phases in the life cycle of an MQT 164: creation, usage, and maintenance.

Figure 2:
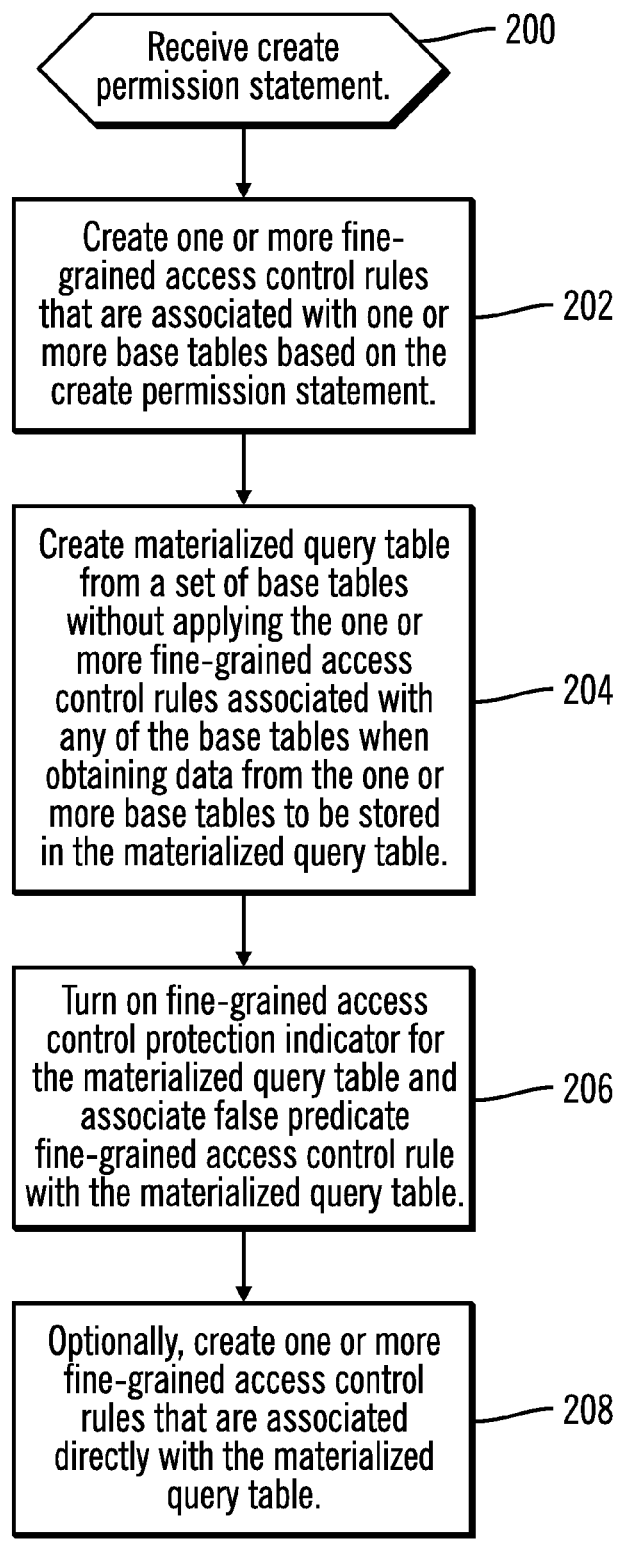
FIG. 2 illustrates, in a flow diagram, logic performed by the database system to create an MQT in accordance with certain embodiments.

FIG. 2 illustrates, in a flow diagram, logic performed by the database system to create an MQT 164 in accordance with certain embodiments. Control begins at block 200 with the database system 110 receiving a create permission statement. In block 202, the database system 110 creates one or more fine-grained access control rules that are associated with one or more base tables 162 based on the create permission statement. In block 204, the database system 110 creates an MQT 164 from a set of base tables 162 without applying the one or more fine-grained access control rules associated with any of the base tables 162 when obtaining data from the one or more base tables to be stored in the materialized query table. In block 206, the database system 110 turns on a fine-grained access control protection indicator for the MQT 164 and directly associates a false predicate fine-grained access control rule with the materialized query table. In block 208, the database system 110, optionally, creates one or more fine-grained access control rules that are associated directly with the MQT 164. That is, separate fine-grained access control rules may be associated with the MQT 164 and the one or more base tables 162. For example, fine-grained access control rules may be associated with the MQT 164 that are different from the fine-grained access control rules associated with the one or more base tables 164.

That is, when creating the MQT 164, if any dependent base table 162 is protected with fine-grained access control, fine-grained access control on that base table 162 is not applied during the process of creating the MQT 164 on that base table 162.

On the other hand, suppose that fine-grained access control on the base table 162 were applied, then, this would result in an MQT 164 whose content is dependent on the permissions available to the user who creates the MQT 164. The MQT 164 would thus lose its value as a data cache for better query performance. Moreover, this would make query rewrite using MQT 164 complicated since it will be necessary to compare the permissions available to the MQT 164 creator with those of the user issuing the query to be rewritten to that MQT 164. It is important to avoid giving access to more rows than what one qualifies for (e.g., when the MQT 164 creator has more permissions than the user), or giving access to fewer rows than what one qualifies for (e.g., when the MQT 164 creator has less permissions than the user). Also, given that permissions may be any valid conjunction of SQL predicates, comparing the permissions available to two different users is difficult (e.g., the result of some predicates may not even be known before execution time).

Thus, to ensure that Objective No. 1 is met, fine-grained access control will not be applied on any fine-grained access control protected base table 162 during the process of creating an MQT 164 on that base table 162. This protection associates a default false predicate fine-grained access control rule to the MQT and the MQT 164 is automatically created with fine-grained access control protection turned ON for the MQT 164. This ensures that Objective No. 2 above is also met. This protection ensures that direct access to the content of the MQT 164 (e.g., SELECT * FROM MQT 164_1) is not allowed until an appropriate permission is created or fine-grained access control is turned OFF on the MQT 164 by the security administrator. However, internal query rewrite to the MQT 164 by the statement compiler 120 is not subject to fine-grained access control on the MQT 164 itself.

An MQT 164 may be used in two different ways: direct access (e.g., in a SELECT statement) and internal query rewrite by the statement compiler 120.

Figure 3:
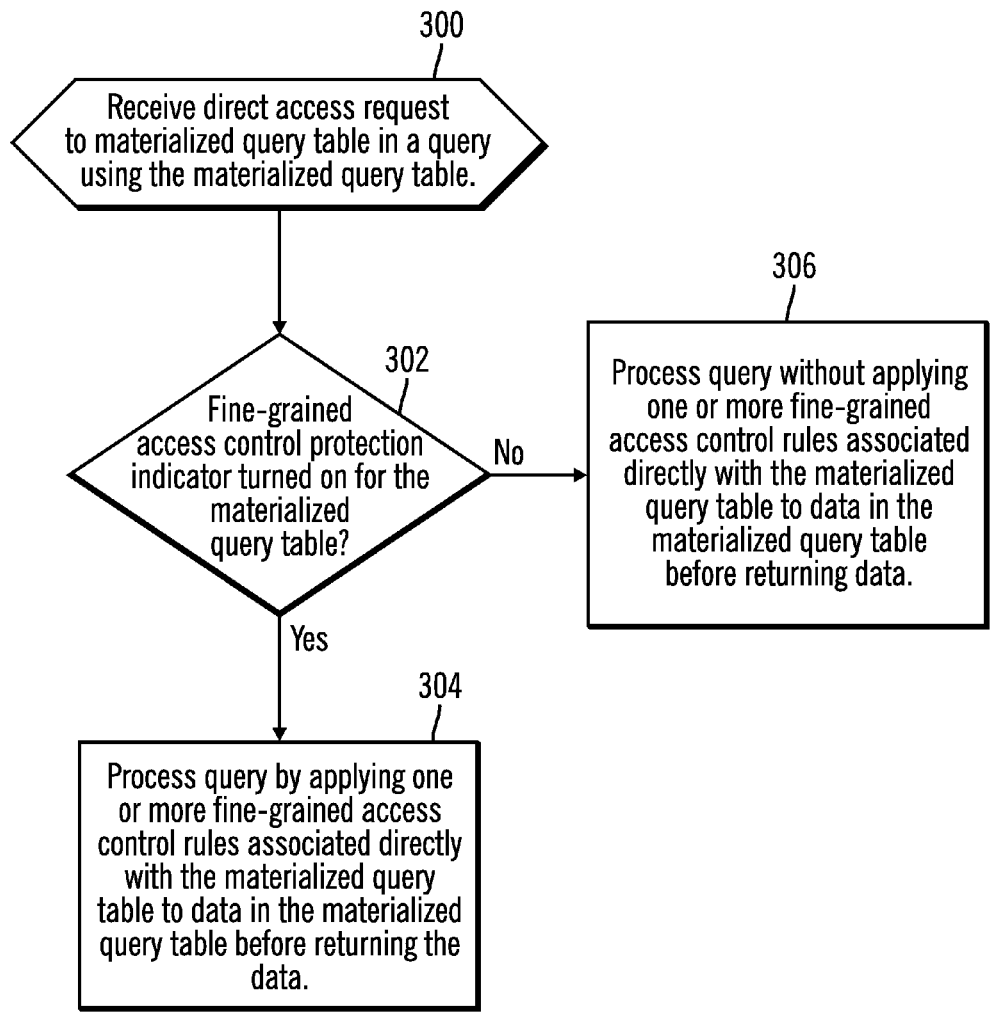
FIG. 3 illustrates, in a flow diagram, logic performed by the database system to directly access an MQT in accordance with certain embodiments.

FIG. 3 illustrates, in a flow diagram, logic performed by the database system to directly access an MQT 164 in accordance with certain embodiments. Control begins at block 300 with the database system 110 receiving a direct access request to a materialized query table in a query using the materialized query table. In block 302, the database system 110 determines whether a fine-grained access control protection indicator is turned on for the materialized query table. If so, processing continues to block 304, otherwise, processing continues to block 306.

In block 304, the database system 110 processes the query by applying one or more fine-grained access control rules associated directly with the materialized query table to data in the materialized query table before returning the data. In block 306, the database system 110 processes the query without applying the one or more fine-grained access control rules associated directly with the materialized query table to data in the materialized query table before returning data (because the fine-grained access control protection indicator is not set to on for the materialized query table (i.e., the indicator is set to off)). As mentioned above, when fine-grained access control rules are associated with a base table 162 on which the MQT 164 relies, a default false predicate fine-grained access control rule is associated with the MQT 164. If only the false predicate fine-grained access control rule exists, no data is returned for a direct access to the MQT 164. However, other fine-grained access control rules may also be associated with the MQT 164, in which case a union of the fine-grained access control rules is used to determine whether any data is returned.

Thus, for direct access, the MQT 164 is processed the same as any other base table 162. That is, if fine-grained access control is enabled on the MQT 164, the fine-grained access control is applied in the same way for the MQT 164 as for a base table 162 with fine-grained access control enabled.

Figure 4:
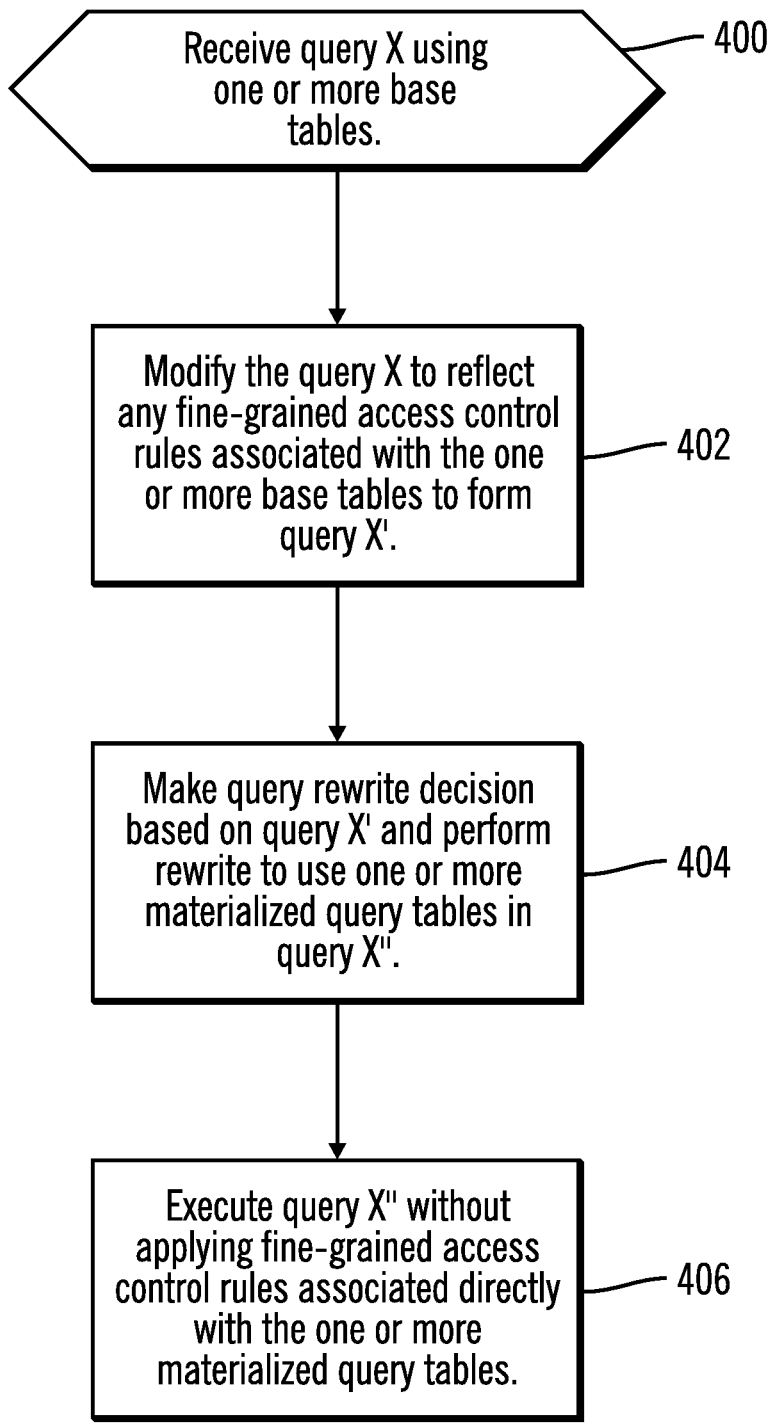
FIG. 4 illustrates, in a flow diagram, logic performed by the database system to access an MQT for internal query rewrite in accordance with certain embodiments.

FIG. 4 illustrates, in a flow diagram, logic performed by the database system to access an MQT 164 for internal query rewrite in accordance with certain embodiments. In certain embodiments, the internal query rewrite may be performed by the query rewrite engine 130 and the optimizer engine 140.

For internal query rewrite by the statement compiler 120, the MQT 164 will not be subject to fine-grained access control defined on the MQT itself. However, fine-grained access control on the dependent base tables 162 will be taken into account before a rewrite decision is made.

In FIG. 4, control begins at block 400 with the statement compiler 120 receiving a query X using one or more base tables. In block 402, the statement compiler 120 modifies the query X to reflect any fine-grained access control rules associated with the one or more base tables 162 to form query X'. In certain embodiments, this query rewriting is done in the Query Graph Semantics (QGS) phase, which precedes the Query ReWrite QRW) phase of query processing by the database system 110. Query rewrite kicks in during the QRW phase and sees the modified query X'. In block 404, the statement compiler 120 makes the query rewrite decision based on query X' (i.e., as if query X' was submitted directly instead of query X) and performs query rewrite to use one or more materialized query tables in query X". That is, in block 404, the statement compiler 120 performs MQT matching to try to make use of MQTs 164 for the query X'. In block 406, the statement compiler 120 executes query X" without applying fine-grained access control rules associated directly with the one or more materialized query tables.

Not applying fine-grained access control defined on the MQT 164 itself during internal query rewrite by the SQL compiler ensures that both Objective No. 1 and Objective No. 2 are met. The user already has access to the base tables 162 (or to the subset thereof if the base tables 162 are fine-grained access control protected), and query re-write may lead to false results if the fine-grained access control defined on the MQT 164 itself is involved in this query re-write. That is, one could potentially get different results depending on whether or not query rewrite occurs. Thus, by ensuring that internal query rewrite by the statement compiler 120 is not subject to fine-grained access control defined on the MQT 162 itself, Objective No. 1 and Objective No. 2 are met.

Figure 5:
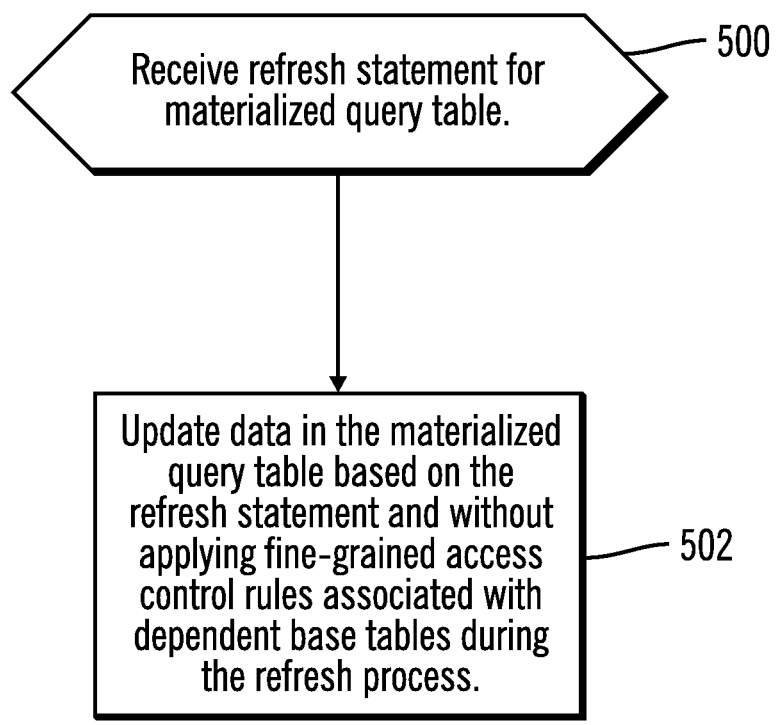
FIG. 5 illustrates, in a flow diagram, logic performed by the database system to maintain an MQT in accordance with certain embodiments.

FIG. 5 illustrates, in a flow diagram, logic performed by the database system to maintain an MQT 164 in accordance with certain embodiments. Control begins at block 500 with the database system 110 receiving a REFRESH TABLE statement for an MQT 164. In block 502, the database system 110 updates data in the MQT 164 based on the refresh statement and without applying the fine-grained access control rules associated with dependent base tables 162 during the refresh process.

In particular, the REFRESH TABLE statement is used to refresh the data in an MQT 164 (either incrementally or a full refresh). As for creating an MQT 164, fine-grained access control on dependent base tables 162 is not applied during the refresh process to ensure that Objective No. 1 and Objective No. 2 are met. This also implies that any fine-grained access control defined on a staging table will not be applied during the refresh process. Staging tables may be described as intermediate tables that capture changes made to base tables and are used to perform incremental MQT maintenance.

Merely to enhance understanding of embodiments, examples will be provided. Embodiments are not intended to be limited to these examples.

The following example CREATE PERMISSION statement creates a permission p1 defined on table t1:

```
CREATE PERMISSION p1 on t1
    FOR ROWS WHERE c1 = 10 AND SESSION_USER = 'Alice'
    ENFORCED FOR ALL ACCESS
ENABLE;
```

The following example ALTER TABLE statement activates row access control for table t1:
ALTER TABLE t1 ACTIVATE ROW ACCESS CONTROL;
The following example CREATE TABLE statement creates an MQT 164 defined on table t1:

```
CREATE TABLE mqt AS (SELECT c1, c5, count (*) AS count from t1
group by c1, c5) DATA INITIALLY DEFERRED REFRESH
DEFERRED;
```

The following REFRESH TABLE statement populates the MQT 164:
REFRESH TABLE mqt;
For the following SELECT statement, direct access to the MQT 164 is blocked (i.e., access is allowed to the MQT 164, but, due to the false predicate fine-grained access control rule associated with the MQT 164, zero rows are returned) because implicit fine-grained access control is activated for the MQT 164:
SELECT * FROM mqt;
For this example, no rows are returned for the above SELECT statement.

Continuing with the example, a user Alice issues the following example query (i.e., SELECT statement):
SELECT c1, c5, count (*) AS count from t1 GROUP BY c1, c5;
The statement compiler 120 modifies the query (internally) prior to MQT matching by injecting the predicate from permission p1 to form query X':

```
SELECT c1, c5, count (*) as count from t1
    WHERE c1 = 10 and SESSIONUSER = 'Alice'
    GROUP BY c1, c5;
```

The statement compiler 120 performs MQT matching and may then rewrite the query to the following query using the MQT 164:

```
SELECT c1, c5, count FROM mqt
    WHERE c1 = 10 AND SESSIONUSER = 'Alice';
```

The following are example scenarios in which an MQT 164 may be defined and which cause the database system 110 to implicitly activate fine-grained access control to control direct access to the MQT 164. This is done to ensure that fine-grained access control protected data in the base table 162, which is a direct or indirect source to an MQT 164, are not inadvertently disclosed through the MQT 164.

In a first scenario, row or column access control is activated for a base table 162. Later, an MQT 164 is created that references the base table 162 in its definition or references a view whose underlying table is the base table 162. This results in restricting access to the MQT 164 directly as the database system 110 implicitly activates fine-grained access control for the MQT 164. To open direct access to the MQT 164, an enabled row permission may be created to provide direct access or fine-grained access control may be deactivated for the MQT 164.

In a second scenario, row or column access control is activated for a base table 162, which is a direct or indirect source to an MQT 164. This results in restricting access to the MQT 164 directly as the database system 110 implicitly activates fine-grained access control for the MQT 164. To open direct access to the MQT 164, an enabled row permission may be created to provide direct access or fine-grained access control may be deactivated for the MQT 164.

In a third scenario, an MQT 164 is defined on a base table 162 that is not enforced by row or column access control or is defined on a view whose underlying base table 162 is not enforced by row or column access control. Later, row or column access control is activated for the MQT 164. Then row or column access control is activated for the base table 162. No implicit enforcement is necessary to control direct access to the MQT 164 since the MQT 164 already has its own access control.

In a fourth scenario, a base table 162 without enforced row or column access control is altered to be an MQT 164 when the full select of the MQT 164 definition references a base table 162 that is enforced by row or column access control or a view for which an underlying table is enforced by row or column access. This results in restricting access to the MQT 164 directly as the database system 110 implicitly activates fine-grained access control for the MQT 164. To open direct access to the MQT 164, an enabled row permission may be created to provide direct access or fine-grained access control may be deactivated for the MQT 164.

In a fifth scenario, a base table 162 with enforced row or column access control is altered to be an MQT 164. The full select of the MQT 164 definition references a base table 162 that is enforced by row or column access control or a view for which an underlying table is enforced by row or column access. No implicit enforcement is necessary to control direct access to the MQT 164 since the MQT 164 already has its own access control.

In a sixth scenario, an MQT 164 is altered to a regular base table 162. If row or column access control is activated for the MQT 164, when the MQT 164 is changed to a regular base table 162, the regular base table 162 retains the access control of the MQT 164.

Thus, embodiments provide techniques for managing an MQT 164 in a database system. Embodiments provide the base table 162 and define fine-grained access control rules associated with the base table 162. In certain embodiments, the fine-grained access control rules include one or more of: row access control rules and column access control rules. Embodiments create an MQT 164 containing a subset of the data in the base table 162, where the fine-grained access control rules are not applied to the base table 162 during creation of the MQT 164, and where the fine-grained access control rules are enabled for the MQT 164. In certain embodiments, the fine-grained access control rules associated with the MQT 164 correspond to the defined fine-grained access control rules for the base table 162. In certain embodiments, the fine-grained access control rules associated with the MQT 164 are different from the defined fine-grained access control rules for the base table 162. In response to receiving a direct access request to the MQT 164, embodiments provide access to the data in the MQT 164 by applying the fine-grained access control rules before returning the data. In response to receiving an internal query rewrite request, embodiments rewrite the query in accordance with the fine-grained access control rules associated with the base table 162 and do not apply the fine-grained access control rules associated directly with the MQT 164 before returning the data.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The database system 110, the statement compiler 120, the query re-write engine 130 and/or the query optimizer engine 140 may be implemented as hardware (e.g., hardware logic or circuitry), software, or a combination of hardware and software.

Figure 6:
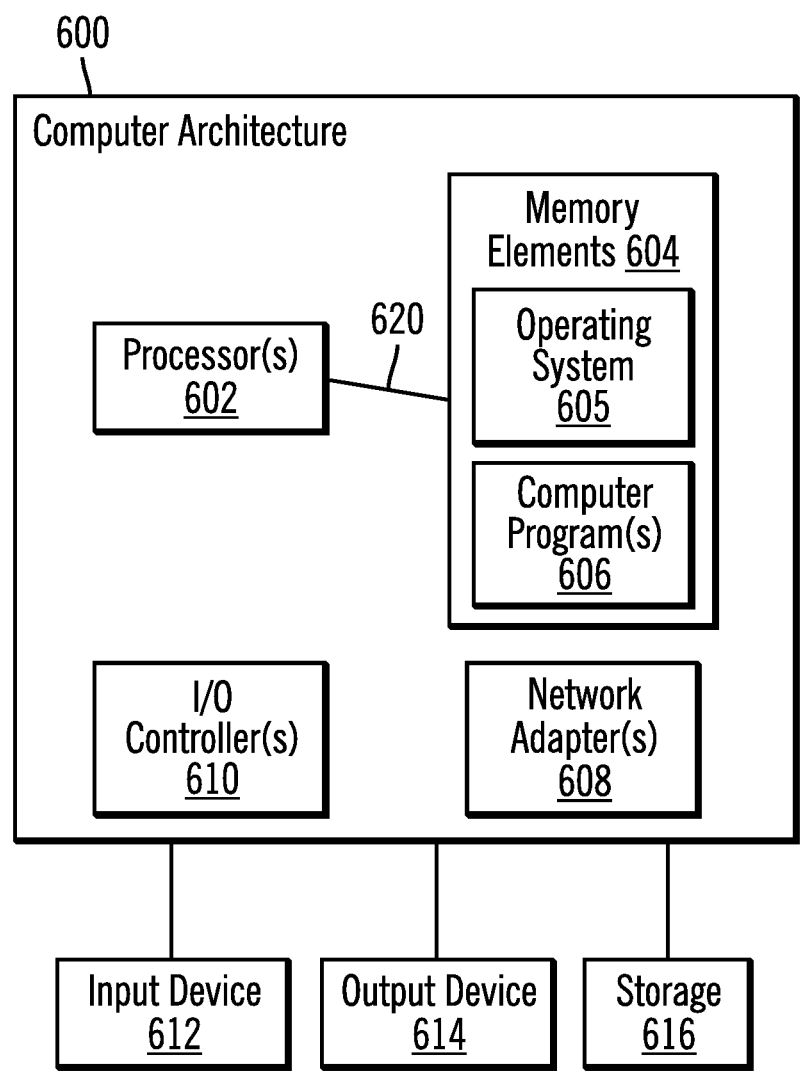
FIG. 6 illustrates, in a block diagram, a computer architecture that may be used in accordance with certain embodiments.

FIG. 6 illustrates a computer architecture 600 that may be used in accordance with certain embodiments. Server computer 100 may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer implemented method, comprising:
creating a materialized query table from a base table without applying one or more fine-grained access control rules associated with the base table when obtaining data from the base table;
associating a rule with the materialized query table, wherein no data is returned from the materialized query table when there are no fine-grained access control rules associated directly with the materialized query table;
in response to receiving a direct access request to the materialized query table in a first query referencing the materialized query table, providing access to the data in the materialized query table by applying a union of the rule and one or more additional fine-grained access control rules associated directly with the materialized query table to the data in the materialized query table before returning the data; and
in response to receiving an internal query rewrite request for a second query that uses the base table,
rewriting the second query to reflect the one or more additional fine-grained access control rules associated with the base table to form a third query;
rewriting the third query to make use of the materialized query table to form a fourth query; and
executing the fourth query without applying the union of the rule and the one or more additional fine-grained access control rules associated directly with the materialized query table.

2. The method of claim 1, wherein the one or more additional fine-grained access control rules include at least one of row access control rules and column access control rules.

3. The method of claim 1, wherein the one or more additional fine-grained access control rules associated directly with the materialized query table correspond to the one or more additional fine-grained access control rules associated with the base table.

4. The method of claim 1, further comprising:
performing materialized query table matching to determine whether to make use of the materialized query table.

5. The method of claim 1, further comprising:
determining whether a fine-grained access control protection indicator is set to on for the materialized query table;
in response to determining that the fine-grained access control protection indicator is set to on, processing the first query by applying the union of the rule and the one or more additional fine-grained access control rules associated directly with the materialized query table to the data in the materialized query table before returning the data; and
in response to determining that the fine-grained access control protection indicator is not set to on, processing the first query without applying the union of the rule and the one or more additional fine-grained access control rules associated directly with the materialized query table to the data in the materialized query table before returning the data.

6. The method of claim 1, further comprising:
receiving a refresh statement for the materialized query table; and
updating the data in the materialized query table without applying the union of the rule and the one or more additional fine-grained access control rules associated with the base table.

7. A system, comprising:
a processor; and
storage coupled to the processor, wherein the storage stores a computer program for execution by the processor to perform operations, the operations comprising:
creating a materialized query table from a base table without applying one or more fine-grained access control rules associated with the base table when obtaining data from the base table;
associating a rule with the materialized query table, wherein no data is returned from the materialized query table when there are no fine-grained access control rules associated directly with the materialized query table;
in response to receiving a direct access request to the materialized query table in a first query referencing the materialized query table, providing access to the data in the materialized query table by applying a union of the rule and one or more additional fine-grained access control rules associated directly with the materialized query table to the data in the materialized query table before returning the data; and
in response to receiving an internal query rewrite request for a second query that uses the base table,
rewriting the second query to reflect the one or more additional fine-grained access control rules associated with the base table to form a third query;
rewriting the third query to make use of the materialized query table to form a fourth query; and
executing the fourth query without applying the union of the rule and the one or more additional fine-grained access control rules associated directly with the materialized query table.

8. The system of claim 7, wherein the one or more additional fine-grained access control rules include at least one of row access control rules and column access control rules.

9. The system of claim 7, wherein the one or more additional fine-grained access control rules associated directly with the materialized query table correspond to the one or more additional fine-grained access control rules associated with the base table.

10. The system of claim 7, wherein the operations further comprise:
performing materialized query table matching to determine whether to make use of the materialized query table.

11. The system of claim 8, wherein the operations further comprise:
   determining whether a fine-grained access control protection indicator is set to on for the materialized query table;
   in response to determining that the fine-grained access control protection indicator is set to on, processing the first query by applying the union of the rule and the one or more additional fine-grained access control rules associated directly with the materialized query table to the data in the materialized query table before returning the data; and
   in response to determining that the fine-grained access control protection indicator is not set to on, processing the first query without applying the union of the rule and the one or more additional fine-grained access control rules associated directly with the materialized query table to the data in the materialized query table before returning the data.

12. The system of claim 7, wherein the operations further comprise:
   receiving a refresh statement for the materialized query table; and
   updating the data in the materialized query table without applying the union of the rule and the one or more additional fine-grained access control rules associated with the base table.

13. A computer program product, comprising:
   a tangible computer readable storage medium having computer readable program code embodied therewith, the computer readable program code, when executed by a processor of a computer, is configured to perform:
      creating a materialized query table from a base table without applying one or more fine-grained access control rules associated with the base table when obtaining data from the base table;
      associating a rule with the materialized query table, wherein no data is returned from the materialized query table when there are no fine-grained access control rules associated directly with the materialized query table; and
      in response to receiving a direct access request to the materialized query table in a first query referencing the materialized query table, providing access to the data in the materialized query table by applying a union of the rule and one or more additional fine-grained access control rules associated directly with the materialized query table to the data in the materialized query table before returning the data; and
      in response to receiving an internal query rewrite request for a second query that uses the base table,
         rewriting the second query to reflect the one or more additional fine-grained access control rules associated with the base table to form a third query;
         rewriting the third query to make use of the materialized query table to form a fourth query; and
         executing the fourth query without applying the union of the rule and the one or more additional fine-grained access control rules associated directly with the materialized query table.

14. The computer program product of claim 13, wherein the one or more additional fine-grained access control rules include at least one of row access control rules and column access control rules.

15. The computer program product of claim 13, wherein the one or more additional fine-grained access control rules associated directly with the materialized query table correspond to the one or more additional fine-grained access control rules associated with the base table.

16. The computer program product of claim 13, wherein the computer readable program code, when executed by the processor of the computer, is configured to perform:
   performing materialized query table matching to determine whether to make use of the materialized query table.

17. The computer program product of claim 13, wherein the computer readable program code, when executed by the processor of the computer, is configured to perform:
   determining whether a fine-grained access control protection indicator is set to on for the materialized query table;
   in response to determining that the fine-grained access control protection indicator is set to on, processing the first query by applying the union of the rule and the one or more additional fine-grained access control rules associated directly with the materialized query table to the data in the materialized query table before returning the data; and
   in response to determining that the fine-grained access control protection indicator is not set to on, processing the first query without applying the union of the rule and the one or more additional fine-grained access control rules associated directly with the materialized query table to the data in the materialized query table before returning the data.

18. The computer program product of claim 13, wherein the computer readable program code, when executed by the processor of the computer, is configured to perform:
   receiving a refresh statement for the materialized query table; and
   updating the data in the materialized query table without applying the union of the rule and the one or more additional fine-grained access control rules associated with the base table.

* * * * *